United States Patent [19]

Espenschied et al.

[11] 4,228,700
[45] Oct. 21, 1980

[54] AUTOMATIC TRANSMISSION WITH ELECTRONICALLY CONTROLLED TORQUE TRANSMISSION DURING GEAR SHIFT

[75] Inventors: Helmut Espenschied; Uwe Kiencke, both of Ludwigsburg; Alfred Schulz, Oberriexingen, all of Fed. Rep. of Germany

[73] Assignee: Robert Bosch GmbH, Stuttgart, Fed. Rep. of Germany

[21] Appl. No.: 932,324

[22] Filed: Aug. 9, 1978

[30] Foreign Application Priority Data

Sep. 19, 1977 [DE] Fed. Rep. of Germany ....... 2742031

[51] Int. Cl.³ .............................................. B60K 41/06
[52] U.S. Cl. ......................................... 74/866; 74/861
[58] Field of Search .................................. 74/861, 866

[56] References Cited

U.S. PATENT DOCUMENTS

| | | | |
|---|---|---|---|
| 3,653,281 | 4/1972 | Shirai et al. | 74/866 |
| 3,662,625 | 5/1972 | Wakamatsu et al. | 74/866 |
| 3,710,647 | 1/1973 | Dach et al. | 74/866 |
| 3,724,295 | 4/1973 | Wakamatsu et al. | 74/866 |
| 3,732,755 | 5/1973 | Beig | 74/866 |
| 3,898,894 | 8/1975 | Aono et al. | 74/866 |
| 3,903,759 | 9/1975 | Hashimoto | 74/866 |
| 3,922,933 | 12/1975 | Sakai et al. | 74/866 |
| 3,942,393 | 3/1976 | Forster et al. | 74/866 |
| 4,068,543 | 1/1978 | Sakai et al. | 74/866 |
| 4,131,036 | 12/1978 | Ivey | 74/866 |
| 4,140,031 | 2/1979 | Sibend et al. | 74/866 |

FOREIGN PATENT DOCUMENTS

| | | |
|---|---|---|
| 1964524 | 7/1970 | Fed. Rep. of Germany ............. 74/861 |
| 2036732 | 2/1972 | Fed. Rep. of Germany . |
| 2124024 | 11/1972 | Fed. Rep. of Germany . |
| 2431351 | 1/1976 | Fed. Rep. of Germany . |
| 2656061 | 7/1977 | Fed. Rep. of Germany . |

Primary Examiner—Leslie Braun
Attorney, Agent, or Firm—Frishauf, Holtz, Goodman & Woodward

[57] ABSTRACT

A first and second valve respectively associated with the then-present and the newly selected gear during a gear shift operation are operated with positive overlap at the beginning of the shift process if the engine is upshifting under load or downshifting under no and at the end of the shift process if the engine is upshifting under no load or downshifting under load. During the shift process the engine speed is lowered during upshift operations and increased during downshifts. The shifting process is terminated when the engine is operating synchronously with the transmission output. It is also terminated if the engine speed decreases excessive during upshifts or increases excessively during downshift or if a predetermined maximum allowable time has elapsed from the start of the shift operation. The main pressure in the gearing is decreased during the shift operation by a factor selected in accordance with the then-present operating condition.

The present invention relates to an automatic transmission in which torque is transmitted from the engine to an output, such as the wheels of a vehicle, during the gear shift operation. More particularly, it relates to systems wherein the operation of the valves associated with the then-present gear and the newly selected gear is electronically timed and wherein the main pressure in the gearing and the engine speed are electronically controlled during gear shift operations.

23 Claims, 12 Drawing Figures

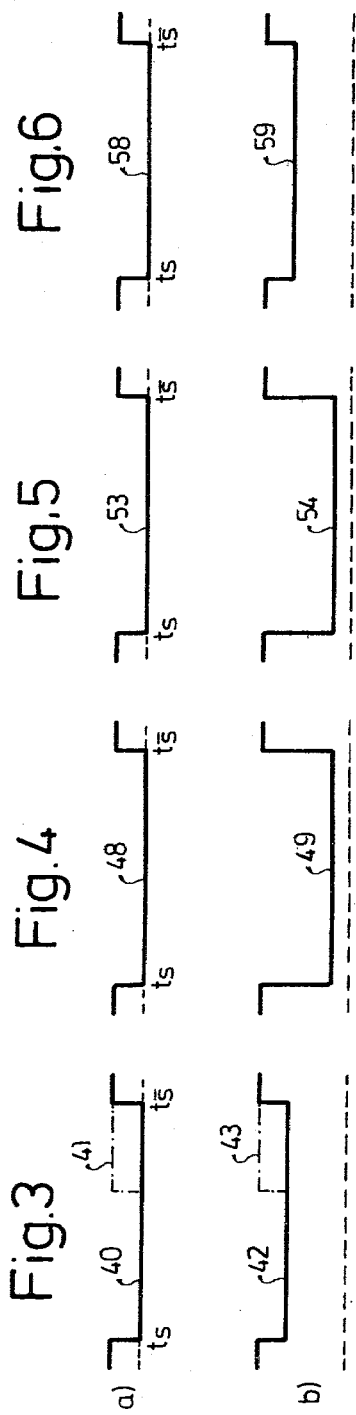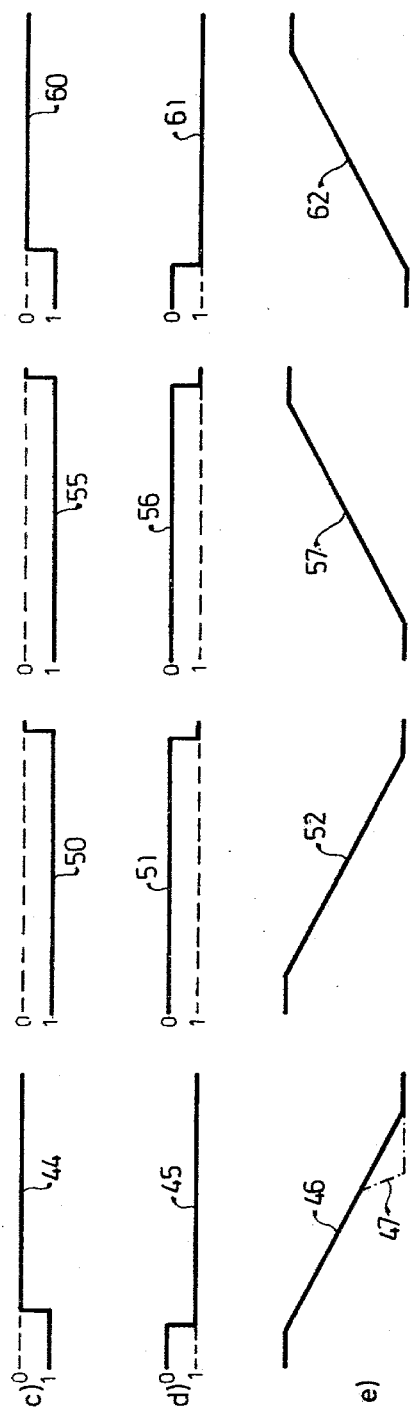

AUTOMATIC TRANSMISSION WITH ELECTRONICALLY CONTROLLED TORQUE TRANSMISSION DURING GEAR SHIFT

The present invention relates to an automatic transmission in which torque is transmitted from the engine to an output, such as the wheels of a vehicle, during the gear shift operation. More particularly, it relates to systems wherein the operation of the valves associated with the then-present gear and the newly selected gear is electronically timed and wherein the main pressure in the gearing and the engine speed are electronically controlled during gear shift operations.

BACKGROUND AND PRIOR ART

Automatic transmissions for apparatus in which torque has to be transmitted from an engine to an output are well known. The gear shift takes place in order to utilize the available torque from the engine in the best possible manner. Depending on the type of gearing used, the torque may be transmitted during gear shifts or the transmission of torque may be interrupted. The present invention concerns itself with transmissions in which torque is transmitted during the gear shift operation. In such known apparatus planetary gears are generally used. In order to change the gear ratio, hydraulically operable couplings or brakes are provided which drive or brake the sun or the planet gear. For this purpose a plurality of valves is provided each of which hydraulically operates an associated gear. For shifting from a then-present gear to a newly selected gear the valve associated with the then-present gear must be deactivated and that of the newly selected gear activated. If the transmission of torque is not to be interrupted, it is necessary that the valve associated with the newly selected gear be activated prior to the time that the valve associated with the then-present gear is deactivated. This process is known as a valve activation with positive overlap. Since the output torque of the engine is changed during a change in gear ratio it is necessary to provide means which prevent undesired torque peaks which might cause a jerk. It is also necessary to sense the speed at the input and the output of the gearing in order to terminate the shift process when the transmission input (engine output) and transmission output are operating in synchronism.

The operation of the gearing thus depends upon the system which controls its operation. This determines the wear and thus the life of the transmission as well as the smoothness of the transition, that is, for example, the comfort of the passengers of a vehicle.

Automatic electronically controlled transmission systems both for passenger vehicles and trucks are known. For example DT-OS No. 2,036,732 discloses a digital control system for automatic transmissions. This apparatus includes electronic sensors for sensing the engine speed and the output speed of the transmission. The sensed engine speed and transmission output signals are applied to Schmitt trigger circuits by means of which it can be determined whether the engine speed is lower than, equal to or higher than the transmission output speed. Depending on the so-determined operating condition, a brake may be applied to the transmission shaft or to the engine shaft or the supply of fuel to the engine may be regulated. It is the disadvantage of this system that cooperation between a purely mechanical synchronization member such as a brake with an electronically controlled fuel regulating system is difficult to achieve.

The suggestion has also been made that torque transmission during gear shift can be controlled by interrupting the fuel supply briefly during the shift operation. Specifically, this is to take place in response to the shift initiate signal during upshift and after a slight delay during downshifts. This method is relatively inaccurate and is suitable only for very simple drives.

Besides the above described systems which control the variation of torque by affecting the motor, other systems are known in which the torque transmission is affected by activation of the various couplings and brakes of the gearing itself. For this purpose the "jerk" or jolt of the vehicle is taken as reference and the couplings and brakes are so-controlled as to minimize such a jolt.

German DT-OS No. 2,124,024 discloses a system controlling automatic transmissions in which the couplings and brakes of the gearing are controlled so as to match a predetermined rate of change of motor speed with respect to time. This predetermined rate of speed is set in accordance with the motor speed, the motor torque, the direction of shift, the newly selected gear ratio, the temperature of the oil of the transmission and the load on the vehicle. These factors determine a reference value for the above mentioned jolt. The actual value of the jolt is taken to be the derivative with respect to time of engine speed. The actual and reference values are applied to a regulator which controls a pressure regulating member activating friction elements via an amplifier and an output control member. Peaks which might appear during the gear shift operation in either the torque or the oil pressure in the pressure regulating member are decreased by inserting delay elements, for example RC circuits in the electronic circuitry or oil atomizers in the hydraulic system. The disadvantage of these systems is that the actually present jolt is not sensed completely and that the jolt following the end of the shift process is not taken into consideration at all.

It has also been proposed that the actual jolt could be sensed, the jolt following the end of the shift process could be computed and the control of the couplings and brakes in the transmission could be carried out in such a manner that neither the actual jolt value during the shift operation nor the computed value at the end of the shift operation exceeds a predetermined reference value.

Finally it has been proposed to carry out the control of the couplings and brakes in the transmission in such a manner that the difference between the input and output speed of the gear is first reduced to a predetermined difference and that the speed thereafter be regulated in such a manner that a predetermined angle exists between the variation with respect to time of the transmission input and output speeds.

All the above described arrangements have the disadvantage that differences in the operating conditions between upshift and downshift and load and no load are not taken into consideration. Further, the torque transmission is changed by control of only one part of the drive system, that is either of the motor or, on the other hand, of the couplings and brakes associated with the transmission.

THE INVENTION

In accordance with the present invention a load/shift direction sensor is provided which furnishes a selector signal indicative of a pedetermined combination of engine load and shift direction. Specifically, the load/shift direction sensor furnishes a first selector signal (e.g. a "1" signal) in the joint presence of a load signal signifying no load and a shift direction signal signifying a downshift or a load signal signifying operation under load and a shift direction signal signifying upshift. It furnishes a second selector signal (a "0" signal) during operation under load during a downshift or no load during an upshift. The timing of the valve activator means for a first valve associated with the then-present gear and a second valve associated with a newly selected gear takes place in dependence on the first and second selector signals. The main pressure in the gear is also controlled in dependence upon the selector signals, while the engine speed is controlled by means of a regulator. The variation of shift parameters as a function of the torque characteristic curve of the engine is obviated by the above described means. Thus a great number of different types of engines, for example even supercharged internal combustion engines can be used in the drive systems. The quality of the shift is also not affected by the operating temperature, the manufacturing tolerances and the wear of the drive.

In known transmissions which operate with torque transmission during the shift operation it was almost impossible to utilize groups of gears since simultaneous shifting of at least two friction elements per group could not be technically controlled in a suitable fashion. However with the simultaneous regulation of engine speed, main pressure, and of the operation of the shift valves this has been made possible. Further, the space occupied by main and auxiliary transmissions in accordance with the present invention is reduced, as is the weight and the manufacturing cost. Thus the use of main and auxiliary transmissions operating as groups in commercial vehicles such as trucks has become possible. For this type of vehicle the additional advantage exists that the operation of the system is substantially independent of the load on the vehicle and the slope of the road.

In preferred embodiments of the present invention the shift process is initiated by a shift initiate signal and is ended by a shift terminate signal. The shift terminate signal is generated when either:
1. The engine speed and the output speed of the transmission are in synchronism;
2. The first derivate with respect to time of the output speed of the transmission is less than a predetermined minimum value during upshifts or greater than a predetermined value during downshifts or
3. A predetermined time interval has elapsed since the initiation of the shift process.

In the first case, the shift process takes place without undesired jolts, in the second case the kinetic is utilized more fully by forced synchronization during, for example, travel along very steep roads, and in the last case the total shift time is limited by means of a forced synchronization. Thus the wear on the couplings and the brakes in the stepped gear transmission are considerably reduced and heating of the coupling elements because of an excessively large shifting time is prevented.

In a further preferred embodiment shift commands are suppressed if the engine is operating under full load and the speed of the engine decreases too rapidly. Driver initiated processes which should really not take place are thereby prevented, again decreasing the wear on the transmission.

It is also advantageous to store the load signal which is present at the start of a shift process until the end of the shift process. For example, the load signal is the signal at the output of the injection pump which injects fuel into the engine. By storing the signal at the start of the shift process the main pressure in the transmission is maintained at the corresponding value throughout the shift process and chages in pressure which might otherwise result from changes in the load signal are prevented. As is disclosed in our co-pending application Ser. No. 932,172, filed simultaneously herewith (ref. 2) the main pressure in the transmission is adjusted to a first value exceeding that required to transmit the then-present torque when no shift is taking place, is decreased to a second value upon initiation of an upshift under load or a downshift under no load, and is decreased to a third value upon initiation of upshift under no load or downshift under load. It should be noted that the pressure is not decreased to zero under any of the above described operating conditions, thus damping torsional oscillations in the output.

The valves operating the different gears are activated at the start of the shift process during upshift under load and downshift under no load and are operated at the end of the shift process for upshift under no load and downshift under load. Because of the simultaneous decrease of main pressure to the value required to transmit the then-present torque in the new gear under the first two operating conditions mentioned above, an effective suppression of torque peaks is achieved, while the decrease of main pressure to a substantially lower value in the then-present gear prevents torsional vibrations in the output.

DRAWINGS ILLUSTRATING A PREFERRED EMBODIMENT

FIGS. 3, 4, 5 and 6 show, respectively, the variation with respect to time of a number of operating parameters and control signals in the embodiments shown in FIGS. 1 and 2 for, respectively, upshift under load, upshift under no load, downshift under load and downshift under no load;

Figure 1:
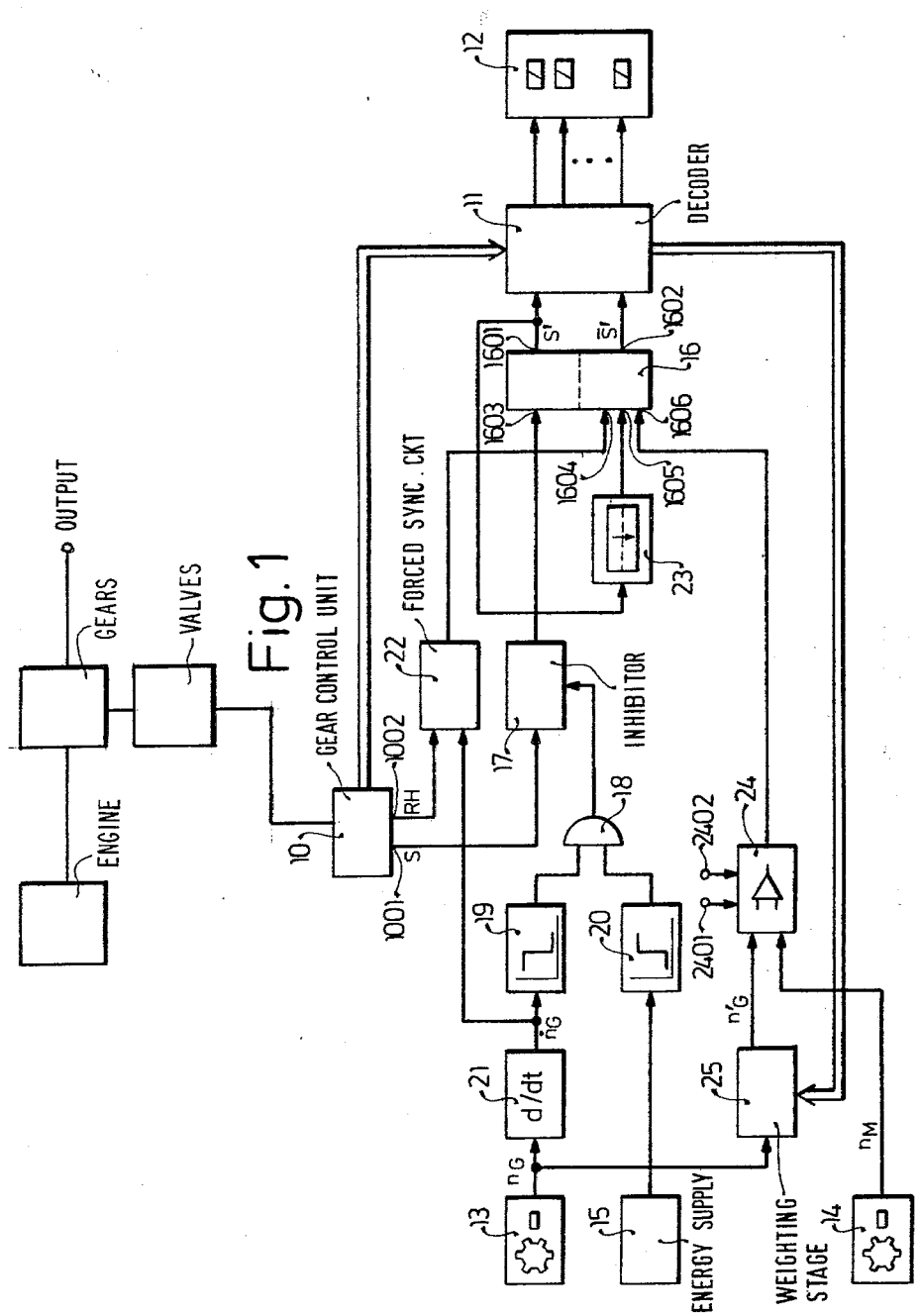
FIG. 1 is a block diagram of a first preferred embodiment of a transmission control system according to the present invention.

Before describing the present invention with reference to the drawing, it should be noted that the present invention is a control system for stepped gear transmissions in which the torque of an engine is transmitted to an output. A preferred application is in the field of motor vehicles and, particularly, in motor vehicles having a Diesel engine, an electronically controlled injection pump and a automatic transmission operable in a plurality of gear ratios and having planetary gearing. The invention is however not to be limited to this particular application but is also suitable for application for other drive systems as for example otto engines, gas turbines and electric motors in which electronic speed regulation takes place and which require a transmission operable in a plurality of gear ratios.

The basic ideas underlying the system of the present invention, that is a system for controlling torque transmission during gear shifts, are as follows:

1. During gear shift the energy supply is no longer controlled by the gas pedal. Control is shifted to a regulator which regulates the engine speed at a predetermined rate of change of speed until a predetermined relationship exists between engine speed and transmission output speed.
2. The predetermined relationship between the engine speed and the output speed of the transmission is detected electronically and a signal signifying synchronism between the two speeds is generated when a predetermined difference exists between the two speeds. This predetermined difference is different for upshifts and downshifts.
3. A logic circuit is furnished which differentiates between predetermined combinations of upshift and downshift and load and no load conditions.
4. The timing of activation of the valves associated with the then-present and the newly selected gear varies as a function of the operating conditions determined in 3 above. However the valve associated with a newly selected gear is always operated before the valve associated with the then-present gear.
5. The main pressure in the transmission is decreased, again in accordance with the operating condition determined under 3 above to a lower value than is present if no gear shift is taking place. The value of main pressure is maintained constant during the shift operation.

A number of operating parameters must be processed in the system of the present invention. In the case of a drive system for a motor vehicle in which the drive system has an internal combustion engine with injection pump the necessary parameters are the engine speed and the transmission output speed. These are derived from speed sensors which are in themselves well known, and may, for example be inductive sensors. Further, gear control signals are processed, the gear control signals including a shift initiate signal (S) and a shift direction signal (RH) which signifies whether an upshift or a downshift is to take place. The gear shift selection system will in general be completely or semi-automatic, the actual selection of which valves are operable for which particular gear ratios not being a subject of the present invention. The characteristic curves of the gas pedal, the injection pump, the valves associated with the gearing and the main pressure regulator are also required for use in the present invention, but the derivation and processing of these operating parameters is state of the art and not a subject of the present invention.

In FIG. 1 a gear control unit 10 has a first output terminal 1001 and a second output terminal 1002. Terminal 1001 constitutes a shift initiate output terminal and carries a signal initiating a gear shift.

Terminal 1002 is a shift direction output and carries a shift direction output signal indicating whether the desired shift constitutes an upshift or a downshift. The signals from gear control unit 10 which signify the specific shift to be carried out are applied to a decoder 11 to whose output terminals is connected a set of shift valves 12. A gear speed sensor 13 furnishes a signal indicative of the output speed of the gearing while an engine speed sensor 14 furnishes an engine speed signal indicative of the speed of the engine. An energy supply 15 supplies metered energy to the engine. Decoder 11 is controlled by a flip-flop 16 which has a first output 1601, a complementary output 1602, a set input 1603 and reset inputs 1604, 1605 and 1606. Set input 1603 of flip-flop 16 is connected through an inhibitor 17 to output 1001 of gear control unit 10. Inhibitor 17 is controlled by the output of an AND gate 18 whose inputs are connected to threshold stages 19 and 20. Threshold stage 19 is connected through a differentiating stage 21 to gear speed sensor 13, while threshold stage 20 is directly connected to energy supply 15. The output of differentiating stage 21 and the shift direction output terminal 1002 of gear control unit 10 constitute the inputs to a forced synchronization stage 22 whose output is connected to reset input 1604 of flip-flop 16. Reset input 1605 of flip-flop 16 is connected through a timing circuit 23 with output 1601. Reset input 1606 of flip-flop 16 is controlled by the output of a comparator 24. Comparator 24 has two terminals 2401 and 2402, an input connected to the output of a weighting stage 25 and an input connected to the output of engine speed sensor 14. The output of weighting stage 25 is connected to the output of gear speed sensor 13. Weighting stage 25 receives control inputs from decoder 11.

OPERATION

In a preferred embodiment the output of gear control unit 10 at terminal S during a shift operation is a "1" signal and is a "0" signal in the absence of a gear shift. Terminal 1002 carries a "1" signal when an upshift is to take place and a "0" signal when a downshift is to take place. A signal S at terminal 1001 passes through inhibitor 17 and is applied to set input 1603 of flip-flop 16. Inhibitor 17 inhibits gear shifts which are inappropriate under then-prevailing operating conditions. This is particularly the case when the full load threshold of the engine has been reached and the acceleration of the vehicle decreases substantially. For this purpose the outut signal of energy supply 15 which may, for example, be an injection pump, is applied to a threshold stage 20 which is so set that a positive "1" signal is furnished at full load. On the other hand the output of differentiating stage 21 which corresponds to the first derivative with respect to time of the output speed of the gearing is applied to threshold stage 19 whose threshold is so adjusted that a "1" signal appears when the acceleration is less than the predetermined threshold value. AND gate 18 thus furnishes an output when the engine is operating under full load and its acceleration is too low. A "1" output from AND gate 18 causes inhibitor stage 17 to prevent the application of the "1" signal at terminal 1001 to input 1603 of flip-flop 16.

In the absence of a "1" signal at the output of AND gate 18 the "S" signal is applied to flip-flop 16, setting this flip-flop. A "1" signal appears at output 1601. This signal is denoted by S' in FIG. 1. Decoder stage 11 operates under the control of signals applied from gear control unit 10 to select the particular valves 12 which are to be operated for carrying out the desired gear shift. Specifically, the valve corresponding to the then-present gear and the valve corresponding to the gear to which the shift is to be carried out are to be activated in response to the outputs at terminals 1601 and 1602 of flip-flop 16. The gear shift is initiated by the signal S' at output 1601.

To terminate this shift process, one of the reset inputs 1604, 1605 or 1606 of flip-flop 16 must be energized.

Normally, this will take place by energization of input 1606 by the output of comparator 24. This comparator furnishes a signal when the engine speed and the output gear speed are operating in synchronism, that is when these two speeds have a predetermined relationship. For this purpose the weighted gear speed signal and the engine speed signal are applied to its inputs. The gear speed signal $n_G$ is multiplied in weighting stage 25 by a factor corresponding to the gear ratio. The so-weighted signal, $n'_G$, is applied to one input of comparator 24. The output signals from decoder 11 cause the multiplying factor to be set at a value corresponding to the gear to which the shift is to take place. In order to establish a soft shift, the shift process is not terminated exactly when synchronism is achieved between the engine speed and the gearing output speed but takes place when a small offset exists between the two. For this purpose threshold signals are applied to terminals 2401 and 2402 which correspond, respectively, to the offset during upshift and during downshift processes. When the difference between the weighted gear speed signal $n'_G$ and engine speed $n_M$ reaches the value specified by the offset, comparator 24 furnishes a "1" signal and flip-flop 16 is reset. This causes a "1" signal to appear at output 1602 of flip-flop 16 and the shift process is terminated. Reset inputs 1604 and 1605 are provided to terminate the gear shift operation under operating conditions which might cause excessive wear of the couplings in the gearing. Reset input 1604 is connected to the output of the forced synchronization stage 22 which processes the shift direction signal and a signal corresponding to the first derivative with respect to time of the output speed of the gearing. Stage 22 furnishes a "1" signal when the acceleration is too low during an upshift operation or when it is too high during a downshift operation. The first case relates to the infrequent upshifts when climbing an extremely steep road, under which conditions it is important to utilize the kinetic energy of the turning masses of the motor and the gearing to complete the shift operation. Under these conditions a sacrifice is made in the quality of the shift and the shift is carried out before the actual synchronization point between output speed of the gearing and engine speed has been reached to prevent the engine from stalling. The engine would otherwise stall since the output speed of the gearing would decrease sufficiently that the synchronous point could no longer be reached. In the second case excessive engine speed is to be prevented during a downshift. This might occur if the vehicle is, for example, going down a steep grade and the speed of the vehicle becomes excessively high. This criterion can be used alternatively or in conjunction with other speed limiters which may be present. Finally, reset input 1605 of flip-flop 16 terminates the gear shift operation if a predetermined time interval has passed after initiation of the gear shift. For purpose a timing circuit 23 is started with the start of the signal at terminal 1601 and, after the predetermined time interval has passed, furnishes an output signal energizing terminal 1605. This causes the shift process to be completed at the end of the predetermined time interval even if some malfunction in the system would otherwise prevent its completion.

Figure 2:
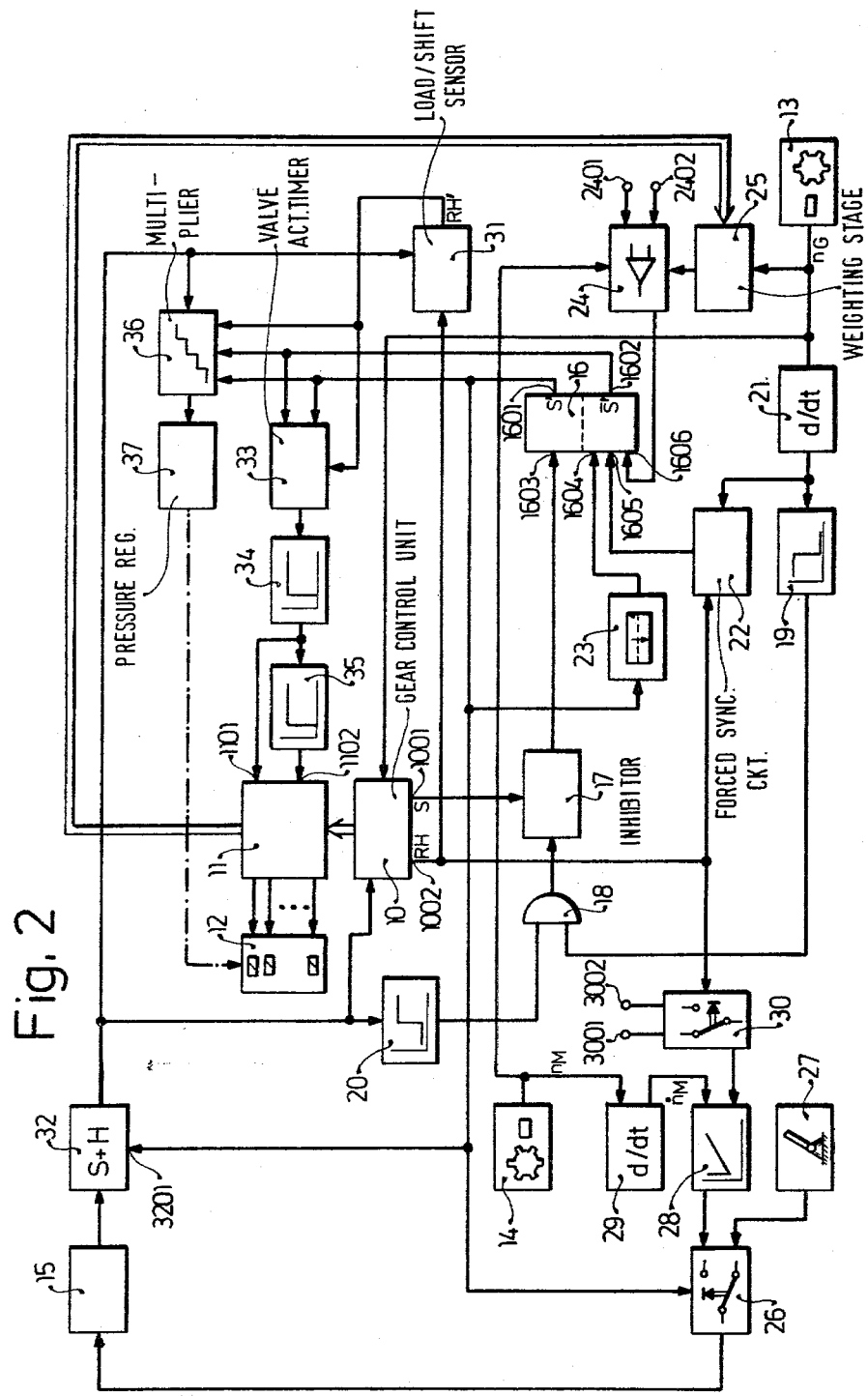
FIG. 2 is a block diagram of a second preferred embodiment of the present invention.

FIG. 2 is a block diagram of a second embodiment of the present invention. The embodiment of FIG. 2 includes that of FIG. 1 and the same elements in the two figures have the same reference numerals. The following description relates only to those components in FIG. 2 which were not present in FIG. 1. A control input of energy supply 15 is connectable either to the gas pedal 27 or to regulator 28 by means of selector switch 26. One input of regulator 28 is connected through a differentiating stage 29 to the output of engine speed sensor 14. A second input of regulator 28 is connectable to either a terminal 3001 or a terminal 3002 through a selector switch 30 whose control input is connected to output 1002 of gear control unit 10. A load/shift direction sensor 31 is also connected to terminal 1002. A further input of load/shift direction sensor 31 is connected to the output of a sample-and-hold circuit 32. The input of sample-and-hold circuit 32 is connected to the output of energy supply 15. The hold input 3201 of sample-and-hold unit 32 is controlled by signal S' at terminal 1601. The output of load/shift direction sensor 31 is connected to the input of a valve activating time selector 33 whose further inputs are connected with the outputs 1601, 1602 of flip-flop 16. Stage 33 is connected to control input 1102 of decoder 11 through a delay time element 34. The output of delay time element 34 is connected through a further delay time element 35 to a further control input 1102 of decoder 11. The outputs of sample-and-hold unit 32, stage 31 and outputs 1601, 1602 of flip-flop 16 are further connected to inputs of a pressure factor selector and multiplier 26 whose output is connected to a main pressure regulator 37. Pressure regulator 37 is operatively connected to the valve set 12.

OPERATION

In addition to the components also shown in FIG. 1, FIG. 2 contains a first group of stages 26, 27, 28, 29 and 30 for regulating the engine speed during gear shift, stage 31 which furnishes a mode selector signal RH' depending upon the then-present load and the direction of shift, stages 33, 34 and 35 for fixing the time at which the valves are activated during gear shift, and circuits 36, 37 for setting the main pressure in the transmission during gear shift.

Under normal operating conditions of the vehicle, switch 26 connects the input of energy supply 15 to the output of an externally activatable means for furnishing a reference value, here a gas pedal 27. When the signal as S' appears at terminal 1601, switch 26 is operated to connect the control input of energy supply 15 to the output of regulator 28. This means that during gear shift the driver has no influence on the amount of energy metered by energy supply 15. Energy supply 15 operates under control of regulator 28 only. Regulator 28 receives an input signal corresponding to the first derivative with respect to time of engine speed and a second input signal which is a reference value supplied by a selected one of terminals 3001 or 3002 connected to regulator 28 by switch 30. Switch 30 is controlled in dependence on signal RH. In a preferred embodiment the signal at terminal 3001 is a signal signifying a reference value for the rate of change of engine speed during a downshift operation, while terminal 3002 furnishes a reference value for the rate of change of engine speed during an upshift. When RH="1", engine speed is decreased in accordance with a reference rate of change which is negative during an upshift. Preferably, regulator 28 is a PI regulator but other types of regulation may be used. Only in the absence of signal S' at output 1601 of flip-flop 16, that is at the end of the gear shift process, is switch 26 returned to its initial position connecting the input of energy supply 15 to gas pedal 27.

The output of stage 31, signal RH', differentiates between two operating modes. Specifically, if the system is operating under no load, the signal RH applied to its input is transmitted in inverted form, while, if the engine is operating under load, the signal RH is transmitted without change. Under these conditions signal RH' will be a "1" for upshift under load and downshift under no load, a "0" for downshift under load and upshift under no load conditions. To determine whether a load is present, one input of stage 31 is connected to the output of sample-and-hold unit 32. When the output of energy supply 15 is less than a predetermined minimum output a no load condition is assumed to exist.

Stage 33 controls the time at which valves 12 are operated. In accordance with the invention valves 12 are operated at the start of the gear shift process during upshift under load and downshift under no load and are activated at the end of the gear shift process during upshift under no load and downshift under load. Signal RH' is a "1" signal during upshift under load and downshift under no load and is a "0" signal during upshift under no load and downshift under load. Depending upon signal RH', activation of valves 12 is initiated by circuit 33 either under control of signal S' corresponding to the initiation of the gear shift process or under control of inverted S' ($\overline{S}'$) corresponding to the end of the shift process. Decoder 11 contains logic circuits which cause the valve associated with the selected new gear to be controlled by the signal at input 1101 and the valve associated with then-present gear to be activated in response to a signal at terminal 1102. The valve activating signal furnished by unit 33 is first delayed in delay time element 34 and then initiates the activation of the valve associated with a new gear by supplying a signal at terminal 1101. After a further delay time in element 35 the valve associated with then-present gear is activated by the signal applied at terminal 1102.

Since the main pressure in the gearing is also controlled by the signal (S' or $\overline{S}'$) which activates valves 12, the delay time of stage 34 is provided to allow the pressure in the gearing to be adjusted before the new gear is activated. The second delay time (generated by element 35) is provided so that the valve controlling the then-present gear is activated only after the valve controlling the next gear has been activated. This positive overlap in the operation of the two valves prevents an interruption of torque transmission through the gearing.

Pressure factor selector and multiplier stage 36 combines signals S', $\overline{S}'$, RH' and the output of sample-and-hold unit 32 to furnish pressure control signals to pressure regulator 37. Stage 36 contains logic circuits differentiating between the following operating modes: no shift, upshift under load, upshift under no load, downshift under load and downshift under no load. In response to the pressure control signals pressure regulator 37 regulates the main pressure in the gearing in accordance with these operating conditions. Pressure factor selector 36 weights the output signal of supply 15 such that a signal is supplied to pressure regulator 37 which causes a main pressure to be applied to unit 12 which exceeds or is less than the pressure required to transmit the then-present torque by a predetermined factor. In a preferred embodiment under normal operating conditions pressure factor computing unit 36 furnishes a signal signifying a factor of 1.5, so that the main pressure in the gearing corresponds to 150% of the pressure required to transmit the then-present torque. This assures a reliable transmission of the torque corresponding to the energy supplied by energy supply 15 and small spikes in the torque do not cause slippage and thus wear of the gearing and a decrease in driving comfort.

Correspondingly, as will be shown below, it is possible to set a factor of 1.0 for upshifts under load and downshifts while the engine is coasting and a factor of 0.3 for downshifts under load and upshifts while the vehicle is coating. Since pressure regulation in the gearing is the same whether an upshift under load or a downshift under no load takes place on the one hand or a downshift under load and an upshift while coasting takes place on the other hand, it is sufficient to determine whether the first or the second set of conditions apply. This information is contained in signal RH'. The decrease of main pressure from 150% starts with initiation of the shift process, that is with the start of signal S', and ends at the end of the shift process, namely at the start of signal $\overline{S}'$.

In order to achieve synchronism between the engine and the gearing, the engine must be braked for upshift operations and accelerated for downshifts. For this purpose the load of the engine is increased or decreased by setting the output of unit 36 to a higher or lower value respectively. The higher value for upshifts may for example be a factor of 1.0 relative to the value required for transmitting the then-present torque. For downshift it is at present the custom to let the engine run at no load. This however has the disadvantage that torsional vibrations may be set up. To avoid this, or at least to dampen such oscillations sufficiently, a factor which is very low but finite is set by pressure factor computing unit 36 for downshifts. The factor in a preferred embodiment is 0.3. The following four operationg conditions prevail:

a. Upshift under load: engine 10' is to be braked; a high pressure factor (1.0) loads the engine and decreases its speed.
b. Downshift under load: engine 10' is to be accelerated; a low pressure factor (0.3) causes the engine speed to increase, since only a low load is applied to the engine.
c. Upshift when coasting: engine 10' is to be braked; when coasting a low pressure factor (0.3) causes the engine speed to decrease, since the engine is being driven by the gearing.
d. Downshift when coasting: engine 10' is to be accelerated; a high pressure factor (1.0) increases engine speed when the engine is coasting, due to the change in the direction of torque transmission from gearing to motor.

The apparatus of the present invention thus allows a three step pressure control which accommodates all possible shift conditions. The gears are protected during engagement, their wear is decreased and the driving comfort is substantially increased since the shift process takes place in a much smoother fashion than with known apparatus.

FIG. 3 shows the variation with respect to time of signal S', of the main pressure, of the activation of the valve associated with the then-present gear, of the activation of the valve associated with the new gear, and of engine speed under the operating mode of upshift under load. FIGS. 4, 5 and 6 show the corresponding variations with respect to time under operating modes of upshift under no load, downshift under load, and downshift under no load.

In FIG. 3a, line 40 indicates the variation of signal S' with respect to time. At time $t_S$ signal S' changes from a "0" signal to a "1" signal, initiating the shifting process. At time $t_{\bar{s}}$, the line 40 returns to its old value, that is the shift process is finished. Dashed line 41 indicates the case in which the forced synchronization stage 22 stops the shifting process by resetting flip-flop 16 before synchronism between the output gear speed and the engine speed has been achieved. The variation of main pressure under the same conditions is shown in FIG. 3b. At time $t_S$ the pressure is decreased from 150% to 100% of that required to transmit the then-present torque. This allows the normal torque to be transmitted while eliminating peaks by slippage in the gearing. At times $t_{\bar{s}}$ the main pressure, which has been maintained constant by sample-and-hold unit 32 throughout the whole shifting process, is returned to the higher value. If the shift process is interrupted by forced synchronization stage 22 before the output gear speed and the engine speed have been synchronized, then the variation of main pressure as a function of time is indicated by dashed line 43.

The activation of the valve associated with the then-present gear is shown by line 44 in FIG. 3c. This activation starts after a predetermined delay relative to time $t_S$. The delay is given by the sum of the delays in units 34, 35. Correspondingly, line 45 indicates the activation of the valve associated with the new gear. Here too a delay relative to time $t_S$ takes place. However the delay corresponds only to that introduced by element 34. FIG. 3e shows the variation of engine speed as a function of time during the gear shift operation. This variation is shown as line 46. As mentioned above, the engine speed is decreased to the synchronous speed at a predetermined rate of change during the gear shift process. This decrease starts at time $t_S$ and is finished when synchronous speed is reached at time $t_{\bar{s}}$. Only in the case of a forced synchronization, as indicated by line 41 in FIG. 3a, is the motor speed variation given by dashed line 47.

FIG. 4 shows the same diagrams as in FIG. 3 during upshift under no load. Line 48 in FIG. 4a illustrates the start and end of the gear shift process. The main pressure variation 49 in FIG. 4b illustrates that under this operating condition the main pressure is decreased from the value present when no gear shift takes place to a much lower value than that of FIG. 3b. This much lower value may for example be 30%. Lines 50 and 51 in FIG. 4c and 4d respectively illustrate that during an upshift under no load the valves associated with the gear shift are activated at the end of the shifting process. Again, the valve element corresponding to the new gear (line 51) is activated before the valve corresponding to the then-present gear (line 50). Thus, under control of signal RH', stage 33 operates to activate valves 12 at the beginning of the shift process when the system is operating to upshift under load and at the end of the shift process when the system is upshifting under no load. Line 52 of FIG. 4e shows the variation of engine speed with respect to time during upshift under no load. Curve 52 is the same as curve 46.

FIG. 5 shows the same variations with respect to time as FIGS. 3 and 4, but for the case of downshift under load. Curves 53, 54, 55 and 56 in FIGS. 5a–5d respectively indicating the variation of signal S', main pressure, and present and new gear activation are the same as those shown in FIG. 4. However, the variation of engine speed as a function of time, curve 57 of FIG. 5e, indicates that a downshift is being implemented, since engine speed is being increased from a lower speed to a higher speed at a predetermined rate of increase.

FIG. 6 shows the same curves as shown in FIGS. 3, 4 and 5, but for downshift under no load. FIGS. 6a–6d showing curves 58, 59, 60 and 61 are identical to FIGS. 3a–3d. FIG. 6e shows curve 62, namely the variation of engine speed as a function of time during downshift under no load conditions. This is the same as curve 57.

Figure 7:
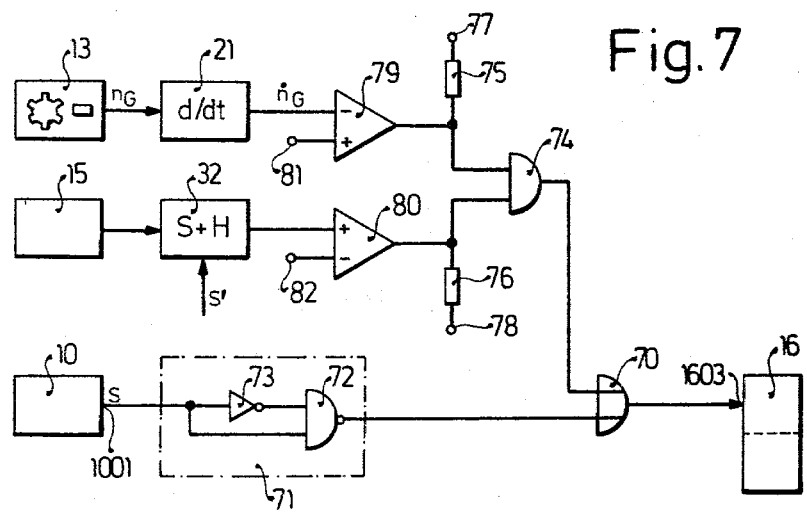
FIG. 7 is a circuit diagram of an inhibitor stage suitable for use in the systems of FIGS. 1 and 2.

FIG. 7 is a circuit diagram of inhibitor stage 17 of FIGS. 1 and 2. The set input 1603 of flip-flop 16 is connected to the output of an OR gate 70. A pulse former stage 71 and an AND gate 74 are connected to the inputs of OR gate 70. Pulse former stage 71 includes a NAND gate 72 one of whose inputs is connected directly and the other through an inverter 73 with output 1001 of gear control stage 10. The inputs of AND gate 74 are connected through resistors 75, 76 with terminals 77, 78. Also connected to one input AND gate 74 is a comparator 79, while a comparator 80 is connected to the other input. The negative input of comparator 79 is connected to the output of differentiating stage 21, while its positive terminal is connected to a terminal 81. The positive input of comparator 80 is connected to the output of sample-and-hold unit 32, while its negative input is connected to a terminal 82.

OPERATION

If flip-flop 16 is constructed using NAND gates, set input 1603 requires a "0" signal for setting the flip-flop. Setting of flip-flop 16 can thus be inhibited by maintaining a "1" signal at input 1603. Thus the output of OR gate 70 should be a "1" signal if the setting of flip-flop 16 is to be inhibited. In the embodiment of the inhibitor stage shown in FIG. 7 this is accomplished by AND gate 74. If the output of AND gate 74 is a "0" output, the signal S from terminal 1001 of stage 10 is transmitted to set input 1603 of flip-flop 16. The transmission of the signal S to input 1603 is accomplished by pulse former stage 71. As long as no gear shift is to be carried out, that is S=0, one input of NAND gate 72 receives a "0" signal while the other receives a "1" signal. The output of NAND gate 72 is therefore a "1" signal. Flip-flop 16 cannot be set. If now the signal at termianl 1001 changes from S=0 to S="1", this "1" signal is applied directly to one input of NAND gate 72. Because of the short delay in inverter 73, the other input of NAND gate 72 will also have a "1" signal for a very brief time. This causes the output of NAND gate 72 to switch for this brief time from a "1" signal to a "0" signal. This short negative pulse is sufficient to set flip-flop 16 is the other input of OR gate 70 carries a "0" signal.

If the setting of flip-flop 16 by the change in signal at terminal 1001 is to be prevented, the second input of OR gate 70 must be a "1" signal. For this purpose a "1" signal must appear at both inputs of AND gate 74. This is the case when the output voltage of differentiating stage 21 is less than the threshold voltage at terminal 81 and, simultaneously, the output voltage of sample-and-hold unit 32 exceeds the threshold voltage at terminal 82. The threshold value applied to terminal 81 corresponds to the lower limiting value of vehicle acceleration. If the actual acceleration is less than this limiting value, the output of comparator 79 (corresponding to threshold stage 19 of FIGS. 1 and 2) allows a "1" signal to be transmitted from terminal 77 to the input of AND gate 74 (which corresponds to AND gate 18 of FIGS. 1 and 2). The voltage applied to terminal 82 corresponds to the full load threshold which, if it is exceeded, causes comparator 80 (corresponding to threshold stage 20 of FIGS. 1 and 2) to allow the signal at terminal 78 to be transmitted to the input of AND gate 74. Thus no gear shift will be carried out under full load and low vehicle acceleration.

Figure 8:
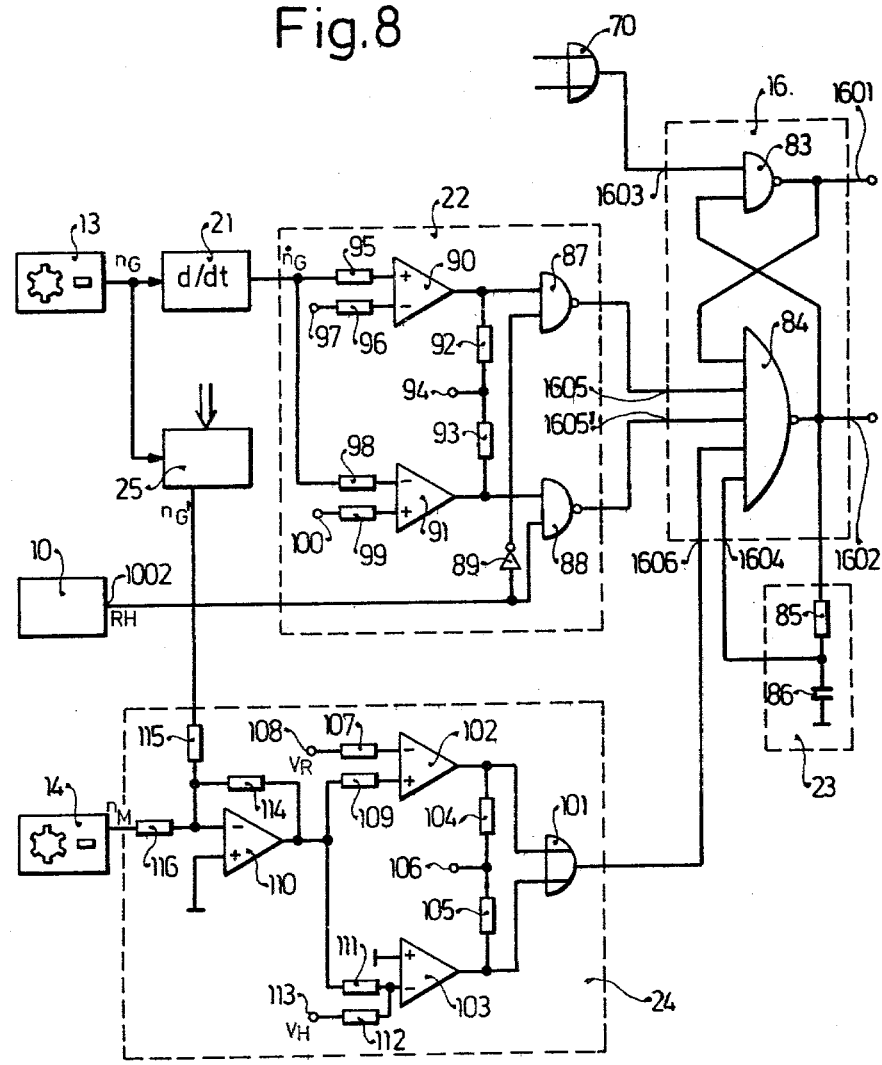
FIG. 8 is a circuit diagram showing a flip-flop, a forced synchronization stage, a shift timing stage and a comparator suitable for use in the systems of FIGS. 1 and 2.

FIG. 8 is a circuit diagram showing flip-flop 16, forced synchronization circuit 22, timing circuit 23 and comparator 24 of FIG. 2 in greater detail.

Flip-flop 16 includes NAND gates 83, 84, the input of NAND gate 83 constituting set input 1603 and the output of NAND gate 83 constituting output 1601. NAND gate 84 has a plurality of inputs 1604, 1605, 1605' and 1606, its output constituting the complementary output 1602 of flip-flop 16.

Timing circuit 23 is an RC circuit including a resistor 85 and a capacitor 86. The output of NAND gate 84 is connected through a resistor 85 with the first reset input 1604 of flip-flop 16. Terminal 1604 is also connected through capacitor 86 to ground potential. If flip-flop 16 is not set, output 1602 furnishes a "1" signal and capacitor 86 is charged. If now flip-flop 16 is set, output 1602 changes to a "0" output and capacitor 86 discharges through a resistor 85. After a predetermined time period determined by the values of resistor 85 and capacitor 86, the voltage across capacitor 86 has decreased sufficiently to cause flip-flop 16 to be reset by the "0" signal at terminal 1604.

Forced synchronization circuit 22 includes NAND gates 87, 88 whose outputs are connected to reset inputs 1605, 1605' of flip-flop 16. One input of NAND gate 87 is connected through an inverter 89 to terminal 1002 of gear selector stage 10, while one input of NAND gate 88 is directly connected to terminal 1002. The second input of NAND gate 87 is connected to the output of a comparator 90 and through a resistor 92 to a terminal 94. The second input of NAND gate 88 is connected to terminal 94 through a resistor 93 and is also connected to the output of a comparator 91. Comparators 90 and 91 may be combined with comparators 102 and 103 to be described below into a single four comparator unit commercially available under number CA 139A. These comparators have an open collector at the output. Resistors 92, 93 (and 104, 105) match the circuit to the TTL level of the subsequent logic circuits, a positive voltage, for example 5 volts for TTL, being applied to terminal 94 (or 106). The positive input of comparator 90 is connected to the output of differentiating stage 21 through a resistor 95, while the inverting input is connected through a resistor 96 to a terminal 97. The negative input of comparator 91 is connected through a resistor 98 to differentiating stage 21, while its direct input is connected through a resistor 99 to a terminal 100.

OPERATION OF FORCED SYNCHRONIZATION STAGE 22

A forced end of the gear shift process is to take place if the vehicle acceleration decreases too much during an upshift process or is excessive during a downshift so that in both cases it is no longer possible to achieve synchronization with the engine speed. For this purpose the vehicle acceleration is first compared to predetermined limiting values. A signal corresponding to the acceleration of the vehicle is available at the output of differentiating stage 21 whose input is connected to the output gear speed sensor 13. This signal is compared in comparators 90 and 91 with predetermined threshold values applied at terminals 97, 100. For example, comparator 90 is assigned to downshift processes. If the vehicle acceleration signal applied at the direct input of comparator 90 exceeds the voltage applied to the inverting input which respresent the threshold value, then a "1" signal appears at the output of comparator 90. During downshift, signal RH is a "0" signal. This signal is inverted in inverter 89 and therefore applies a "1" signal to the second input of NAND gate 87. The signal at the output of NAND gate 87 becomes a "0" signal and resets flip-flop 16. Correspondingly, when the acceleration is less than that represented by the voltage at terminal 100, comparator 91 furnishes a "1" signal so that, for upshift processes where RH is a "1" signal NAND gate 88 furnishes a "0" signal resetting flip-flop 16.

The output of comparator 24 is the output of an OR gate 101 whose inputs are connected to the outputs of comparators 102, 103. The outputs of comparators 102, 103 are interconnected by a series circuit including resistors 104, 105 whose center tap constitutes a terminal 106. The negative input of comparator 102 is connected through a resistor 107 to a terminal 108, while the positive input is connected through a resistor 109 to the output of an operational amplifier 110. The positive input of comparator 103 is connected to ground potential, while its negative input is connected through a resistor 111 to the output of operational amplifier 110 and through a resistor 112 to a terminal 113. A feedback resistor 114 is connected from the output of operational amplifier 110 to its inverting input. The direct input of operational amplifier 110 is connected to ground potential, while its inverting input is connected through a resistor 115 to weighting stage 25 and through a resistor 116 to engine speed sensor 14.

OPERATION OF COMPARATOR 24

Operational amplifier 110 is connected as a summing amplifier and receives the engine speed signal and the gearing output signal after weighting in weighting stage 25 at its inverting input. The weighting is accomplished by multiplying the gear speed signal $n_G$ by a factor corresponding to the gear ratio of the gear to which the shift is taking place. The output of operational amplifier 110 corresponds to the difference between the weighted gear speed and the engine speed. This difference voltage is applied to the inputs of comparators 102, 103. The signal $V_R$ apply to terminal 108 corresponds to the offset for downshift operation while the signal $V_H$ at terminal 113 is the offset during upshift operations. if the difference $n'_G - n_M$ exceeds the offset $V_R$ or is less than the offset $V_H$ the output of comparator 102, 103 respectively furnishes a "1" signal which is transmitted to the output of OR gate 101. Only when the speed difference $n'_G - n_M$ is less than the offset $V_R$ during downshift or greater than the offset $V_H$ during upshift does the output of OR gate 101 go to "0", thereby resetting flip-flop 16.

Figure 9:
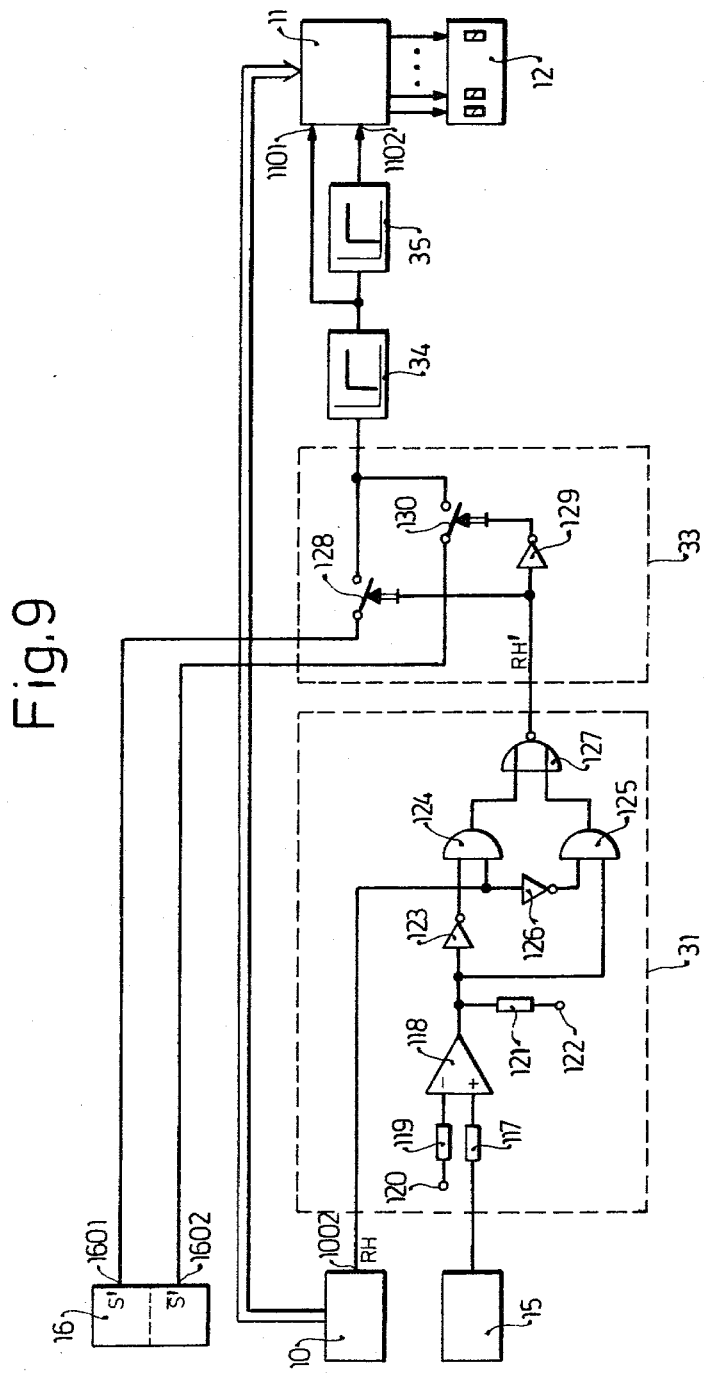
FIG. 9 is a circuit diagram of a load/shift direction sensor stage and a valve activating time selector stage suitable for the system shown in FIG. 2.

FIG. 9 is a circuit diagram of a preferred embodiment of a load/shift direction sensor 31 and a valve activating time selector 33 of FIG. 2.

At the input of stage 31, energy supply 15 is connected through a resistor 117 to the positive input of a comparator 118 whose negative input is connected through a resistor 119 to a terminal 120. The output of comparator 118 is connected through a resistor 121 to a terminal 122 and through an invertor 123 to one input of an AND gate 124. It is further connected directly to one input of an AND gate 125. The output of gear control unit 10, terminal 1002, is directly connected to the second input of AND gate 124 and through an inverter 126 to the second input of AND gate 125. The outputs of AND gate 124, 125 are connected to respective inputs of a NOR gate 127 whose output constitutes the output of stage 31.

OPERATION OF LOAD/SHIFT DIRECTION SENSOR 31

As mentioned above, it is the function of stage 31 to furnish a signal indicative of the then-present operating conditions (upshift, downshift, load or no load). For control of the couplings and brakes in the transmission an upshift under load is equivalent to a downshift under no load, while a downshift under load is equivalent to an upshift under no load. It is thus sufficient to furnish a logic signal which indicates which of the two above mentioned operating conditions is present. For this purpose stage 31 first has to furnish a signal indicating whether no load or load condition exists. Since the torque is determined by the output of the energy supply 15 which meters the energy to the engine, the output signal of energy supply 15 is compared in comparator 118 to a threshold signal which is applied to terminal 120. If the output signal of energy supply 15 is less than this threshold value a no load condition exists, while if it is greater than the threshold value the engine is operating under load. Since the output of energy supply 15 is applied to the positive input of comparator 118, the output of comparator 118 will be a "0" signal under no load conditions and a "1" signal when the vehicle is operating under load. The actual voltage levels are fixed by the auxiliary signal applied at terminal 122. The circuit including AND gates 124, 125, inverters 123, 126 and NOR gate 127 which carries out an exclusive NOR function; that is, its output is a "1" signal when both inputs are the same and a "0" signal when the two inputs are different. The signal at terminal 1002 is a "1" signal when an upshift is to be carried out and "0" signal when a downshift is to be carried out. Thus if an upshift is to take place under load (the signal at terminal 1002 is a "1" signal, the output of comparator 118 is a "1" signal), the output and AND gate 125 will be a "0" signal, the output of AND gate 124 will be a "0" signal and the output of NOR gate 127 will be a "1" signal. For the various different operating conditions the following truthtable applies:

| RH | Operating Condition | Output NOR (35) |
|----|---------------------|-----------------|
| 0  | Under Load          | 0               |
| 1  | Under Load          | 1               |
| 0  | Coasting            | 1               |
| 1  | Coasting            | 0               |

As can be seen from the truth table, the "0" signal appears at the output of stage 31 for upshifts when coasting and downshifts under load, while the "1" signal is present for upshift under load and downshift when coasting. The output signal of stage 31 is denoted by RH'.

Stage 33 includes a switch 128 operating under control of signal RH' to connect the output 1601 of flip-flop 16 to the input of delay time element 34. The signal RH' is also applied to an inverter 129 whose output operates a switch 130 which, when closed, connects output 1602 of flip-flop 16 to the input of time element 34.

OPERATION

During upshift under load and downshift under no load, the operation of valves 12 is to correspond to the initiation of the shift process, while for upshift under no load and downshift under load the activation is to be initiated at the end of the shift. It will be remembered that at the start of the shift operation a short pulse appears at terminal 1601 while at the end of the shift process the same is true at terminal 1602. Since signal RH'="1" for upshift under load and downshift under no load, switch 128 will be closed under these conditions. Thus timing element 34 will start to time the corresponding delay time at the start of the shifting process. Similarly when signal RH' is a "0" signal, switch 130 will be closed, switch 128 will be opened and the timing of delay time element 34 will start at the end of the shift process.

Figure 10:
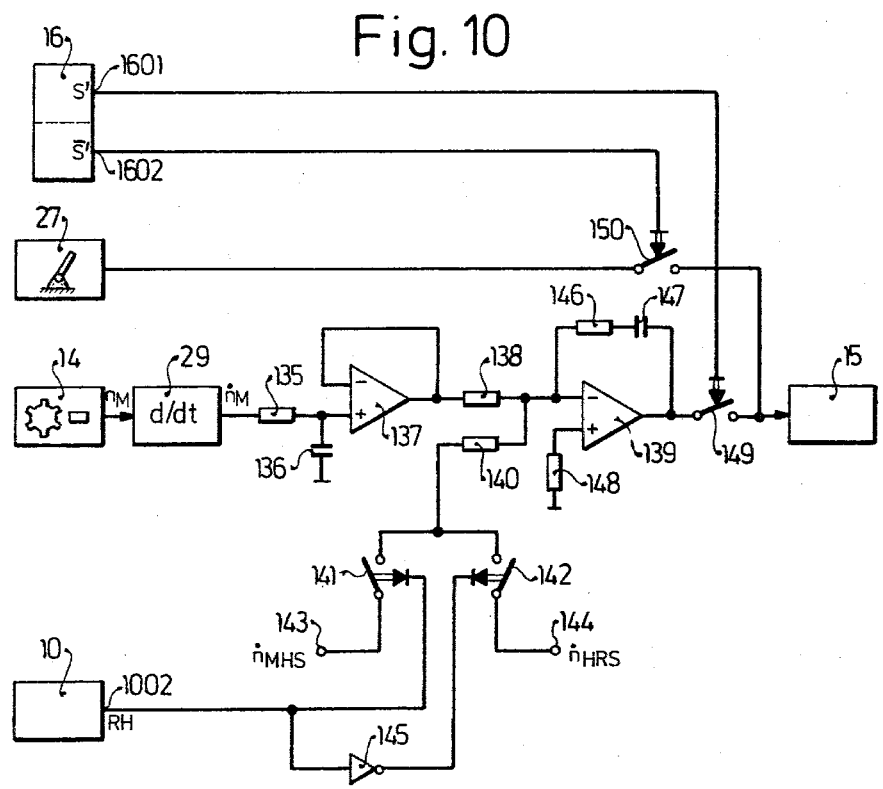
FIG. 10 is a circuit diagram of a regulator and two selector switches suitable for use in the systems shown in FIGS. 1 and 2.

FIG. 10 is the circuit diagram of a regulator and switches appropriate for use in the system of FIG. 2.

The output of differentiator stage 29 which differentiates the engine speed signal is connected through a differentiating network including a resistor 135 and a capacitor 136 to the direct input of an operational amplifier 137. The output of operational amplifier 137 is connected through a resistor 138 with the inverting input of an operational amplifier 139. The inverting input of operational amplifier 139 is also connected through a resistor 140 and through switches 141, 142 to terminal 143 and 144 respectively. The control input of switch 141 is directly connected to terminal 1002 of stage 10 while that of switch 142 is connected through an invertor 145 to terminal 1002. The feedback circuit including the series combination of a resistor 146 and capacitor 147 is connected between the output of operational amplifier 139 and its inverting input. The direct input of operational amplifier 139 is connected to ground potential through a resistor 148. The output of operational amplifier 139 is connectable through a switch 149 to the control input of energy supply 15. The control input of switch 149 is connected to output 1601 of flip-flop 16. The input of energy supply 15 is further connected through a switch 150 to reference signal furnishing stage, e.g. the gas pedal. The control input for switch 150 is derived from terminal 1602.

OPERATION

Regulator 28 and switch means 26, 30, respectively including switches 149, 150 and switches 143, 144 as shown in FIG. 10 operate as follows:

At the start of the shift process the input of energy supply 15 is to be switched from gas pedal 27 to the output of regulator 28. This is accomplished by switches 149, 150 operating under control of the signals at terminal 1601 and 1602 respectively. Under normal driving conditions switch 149 is open and switch 150 is closed. If now gear shift initiation causes a pulse to appear at terminal 1601, switch 149 is closed and switch 150 is opened. Thus the input of energy supply 15 is switched to the output of operational amplifier 139 which constitutes the output of the regulator. The inputs to the regulator are the first derivative with respect to time of engine speed as well as the reference value for the derivative, that is the selected one of the signals at terminals 143 or 144. The first derivative with respect to time of the engine speed is generated in differentiating stage 29 which, for example, is a phase control circuit. Such a phase control circuit furnishes a voltage which is proportional to engine speed and a pulse sequence whose average value is proportional to the change in engine speed. After subsequent smoothing in RC member 136, 137 a voltage results which is proportional to the first derivative with respect to time of engine speed. This signal is applied to the inverting input of operational amplifier 139 which also serves as a summing point. At the input of input of operational amplifier 139 the then-present rate of change of engine speed is compared to the selected reference rate of change of engine speed. Specifically, during an upshift the the voltage at terminal 143 will be connected through resistor 140 to the inverting input of amplifier 139, while during a downshift the voltage at terminal 144 applied through switch 142 will be connected thusly. The signal at the inverting input of operational amplifier 139 thus corresponds to the difference between the actual value of rate of change of engine speed and the desired value. As shown in FIG. 10 a preferred embodiment of the regulator 139 is a PI regulator. However other types of regulators may be used. The regulator output signal is then applied through switch 149 to the input of energy supply 15 until such time as the shift process is completed and signal S' returns to "0". At this time switch 149 opens and the control of energy supply 15 reverts back to the gas pedal.

Figure 11:
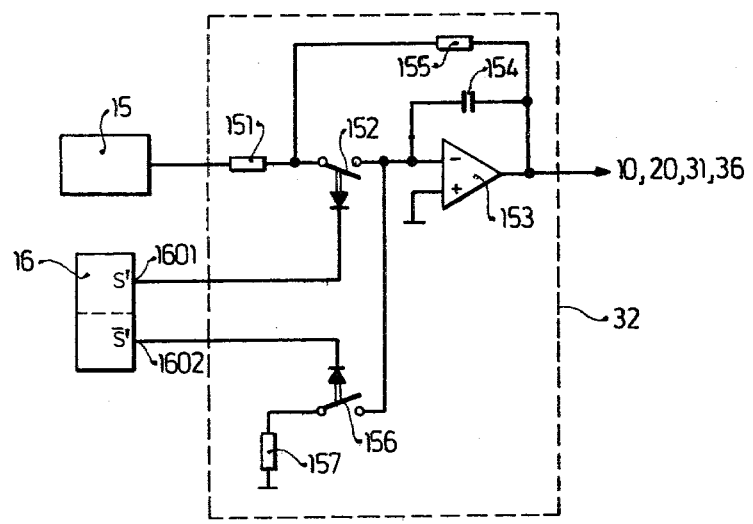
FIG. 11 is a circuit diagram of a sample-and-hold unit suitable for use in the systems of FIGS. 1 and 2.

FIG. 11 is a circuit diagram of a sample-and-hold stage 32 as shown in FIG. 2. The output of energy supply 15 is connected to one input of stage 32. Specifically, this input is connected through a resistor 151 and a switch 152 to the inverting input of an operational amplifier 153 whose direct inputs is connected to ground potential. The output of operational amplifier 153 is connected to its inverting input through a capacitor 154 and to the side of switch 152 connected to resistor 151 through a resistor 155. The inverting input of operational amplifier 153 can also be connected to ground (chassis) potential through a switch 156 whose control input is connected to output 1602 of flip-flop 16. The control input of switch 152 is connected to output 1601 of flip-flop 16. The output of operational amplifier 153 constitutes the output of the sample-and-hold unit.

OPERATION OF THE SAMPLE-AND-HOLD UNIT

Under normal operating conditions, that is when no gear shift is taking place, the output signal of energy supply 15 is to be transmitted directly to all units connected to the output of stage 32. When however a signal appears at terminal 1601, the signal at the input of stage 32 is to be held. As long as no shift process is being carried out, the signal at terminal 1601 is a "0" signal, switch 152 is closed and switch 156 is open. Operational amplifier 153 then acts as a proportional amplifier of first order, its time constant being matched to the dynamics of the input signal. When the signal S' appears at terminal 1601 switch 152 is opened and switch 156 closes. Operational amplifier 153 now acts as an integrator, its inverting input being connected to ground through resistor 157. The signal at the output of operational amplifier 153 and therefore at the output of the sample-and-hold unit 32 will then be the signal which was present at its input at the time that switches 152 and 156 changed state.

Figure 12:
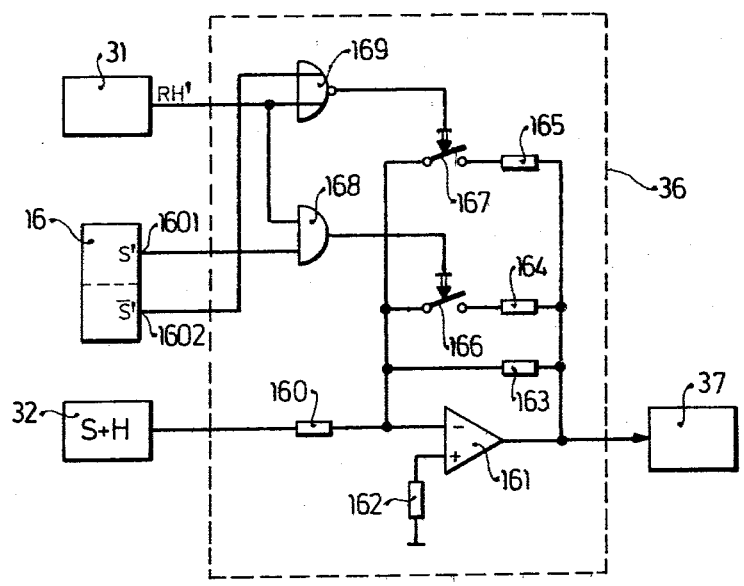
FIG. 12 is a circuit diagram of a pressure factor selector and multiplier stage suitable for use in the system of FIG. 2.

FIG. 12 is a circuit diagram of pressure factor selector and multiplier stage 36 of FIG. 2. The output of the sample-and-hold unit is connected through a resistor 160 to the inverting input of an operational amplifier 161 whose direct input is connected to ground potential through a resistor 162. Operational amplifier 161 has a feedback resistor 163. Further resistors 164 and 165 may be connected in parallel with resistor 163 by closing, respectively, of switches 166 and 167. Switch 166 is controlled by the output of an AND gate 168 while switch 167 is controlled by the output of a NOR gate 169. One input of NOR gate 169 and of AND gate 168 is connected to the output of load/shift direction sensor 31, that is they receive the signal RH'. The second input of NOR gate 169 is connected to terminal 1602 of flip-flop 16, while the second input of AND gate 168 is connected to terminal 1601.

OPERATION OF PRESSURE FACTOR SELECTOR 36

The function of stage 6 in accordance with the present invention is to take the signal from energy supply 15 which appears at the output of sample-and-hold unit 32 and to multiply it by a factor depending upon the then-present operating condition. If no shift is being carried out (S'=0) one input of AND gate 168 is a "0" signal and one input of NOR gate 169 is a "1" signal. The outputs of gates 168, 169 are therefore both "0" and switches 166, 167 are open. The amplitude of the control signal for main pressure regulator 37 is therefore determined by the relationship between resistors 163 and 160 and can be so-adjusted that the main pressure in the gearing is 1.5 times the amount required to transmit the then-present torque. If, however, a shift is to be carried out (S'=1), then for an upshift under no load or a downshift under load (RH'=0) NOR gate 169 furnishes a "1" signal which closes switch 167. Correspondingly, for upshift under load or downshift under no load (RH'=1) AND gate 168 furnishes a "1" signal closing switch 166. In the first case resistor 165 is connected in parallel with resistor 163, in the second case resistor 164 is so-connected. In this way the main pressure can be decreased in dependence on the then-present operating condition. In a preferred embodiment the output signal is decreased to 30% of the input signal when the system is operating for an upshift under no load or a downshift under load and is decreased to 100% for downshift under no load or upshift under load. At the end of the shift process (S'=0) both switches 166 and 167 open and the main pressure again returns to the safety value of, for example, 150%.

In a preferred embodiment the following resistance values were used:

R160=50KΩ
R163=75KΩ
R164=750KΩ
R165=78,75KΩ

The present invention is not to be limited to the specific embodiments shown in the figures.

Various changes and modifications may be made within the scope of the inventive concept.

We claim:

1. In a system having a transmission for transmitting torque from an engine to an output, said transmission having a plurality of gears, a plurality of valves one associated with each of said gears, gear control means (10) for furnishing a shift signal indicative of initiation of a gear shift from a then-present gear to a selected gear and a direction signal (RH) indicative of the direction of said shift, engine speed sensor means (14) coupled to said engine for furnishing an engine speed signal indicative of the speed thereof, transmission output speed sensor means (13) coupled to said transmission for furnishing a transmission speed signal indicative of the output speed of said transmission, and means (15) for furnishing a load signal indicative of the then-present load on said engine, the improvement comprising load/shift direction sensor means (31) having a first input connected to said gear control means to receive said direction signal and a second input connected to said means for furnishing a load signal for furnishing a selector signal indicative of a predetermined combination of engine load and shift direction;

and valve activator means (33, 11) connected to said load/shift direction sensor means and said plurality of valves for timing the activation of a first valve associated with said then-present gear and a second valve associated with said selected gear at least in part under control of said selector signal.

2. Apparatus as set forth in claim 1, wherein said transmission is a hydraulic transmission;

wherein said system further comprises pressure regulator means for regulating pressure in said hydraulic transmission under control of a pressure regulator control signal;

and wherein said improvement further comprises pressure factor selector means (36) for furnishing a pressure regulator control signal varying at least in part in dependence on said selector signal to said pressure regulator means.

3. Apparatus as set forth in claim 2, wherein said means for furnishing a load signal comprises energy supply means operable under control of an energy control signal for furnishing metered energy to said engine;

and wherein said improvement further comprises speed regulator means (28) connected to said gear control means, said engine speed sensor means, said transmission output speed sensor means, and said energy supply means for furnishing an energy control signal changing said engine speed at a predetermined rate of change of speed to said energy supply means until said engine speed has a predetermined relationship to said transmission output speed.

4. Apparatus as set forth in claim 3, wherein said shift signal constitutes a shift initiate signal;

and wherein said improvement further comprises speed comparator means (24) for comparing said engine speed signal to said transmission speed signal and furnishing a comparator output signal when said transmission speed signal and said engine speed signal have a predetermined relationship, said comparator output signal constituting a shift terminate signal.

5. Apparatus as set forth in claim 4, wherein said gear control means further comprises means for furnishing gear selector signals signifying said then-present gear and said selected gear;

and wherein said valve activator means comprises decoder means (11) operative in response to a decoder control signal for activating said first and second valve under control of said gear selector signals, and valve activating time selector means connected to said decoder means for selecting said shift initiate signal or said shift terminate signal under control of said selector signal and furnishing said decoder control signal at a predetermined time relative to the so-selected one of said shift initiate and shift terminate signals.

6. Apparatus as set forth in claim 5, wherein said improvement further comprises bistable circuit means (16) having a first stable state furnishing a modified shift initiate signal and a second stable state for furnishing a modified terminate signal, and means for connecting said bistable circuit means to said gear control means and said speed comparator means in such a manner that said bistable circuit means switches to said first stable state in response to said shift initiate signal and to said second stable state in response to said shift terminate signal.

7. Apparatus as set forth in claim 6, wherein said load/shift direction sensor means comprises means for furnishing a first selector signal in response to the joint presence of a load signal signifying no load and a shift direction signal signifying downshift or a load signal signifying operation under load and a shift direction signal signifying upshift and a second selector signal in the joint presence of a load signal signifying operation under load and a shift direction signal signifying downshift or a load signal signifying no load and a shift direction signal signifying upshift.

8. Apparatus as set forth in claim 7, wherein said valve activating time selector means comprises first activator switch means interconnected between said bistable circuit means and said decoder means and operative under control of said first selector signal for applying said modified shift initiate signal to said decoder means in the presence of said first selector signal, and second activator switch means interconnected between said bistable circuit means and said decoder means for applying said modified shift terminate signal to said decoder means in response to said second selector signal.

9. Apparatus as set forth in claim 8, wherein said decoder means has a first terminal (1101) for receiving signals for activating said first valve and a second terminal (1102) for receiving signals for activating said second valve;

further comprising first delay means interconnected between said valve activating time selector means and said first terminal of said decoder means for delaying the operation of said second valve by a predetermined first time delay following the closing of said first activator switch means, and second delay means interconnected between said first delay means and said second terminal of said decoder means for delaying the activation of said first valve by a second predetermined time delay relative to activation of said first valve.

10. Apparatus as set forth in claim 6, further comprising inhibitor means (17) for blocking the transmission of said shift initiate signal to said bistable circuit means in response to an inhibitor control signal, differentiating means (21) connected to said transmission output speed sensor means for furnishing a gear acceleration signal corresponding to the first derivative with respect to time of said transmission speed signal, and inhibitor control signal furnishing means (18) connected to said load signal furnishing means, said differentiating circuit means and said inhibitor means for furnishing said inhibitor control signal when said gear acceleration signal is less than a predetermined minimum gear acceleration threshold value and said load signal exceeds a predetermined threshold load value.

11. Apparatus as set forth in claim 10, wherein said inhibitor control signal furnishing means comprises a first threshold stage (19) for comparing said gear acceleration signal to said predetermined minimum gear acceleration value and furnishing a first threshold output signal when said gear acceleration signal is less than said predetermined minimum gear acceleration value, second threshold means (20) for furnishing a second threshold output signal when said load signal exceeds the predetermined load threshold value, and an AND gate (18) for furnishing said inhibitor control signal in response to said first and second threshold output signals.

12. Apparatus as set forth in claim 6, wherein said shift terminate signal constitutes a first shift terminate signal;
   further comprising shift timing means (23) for furnishing a second shift terminate signal after a maximum shift time interval following receipt of said shift initiate signal, whereby said shift is automatically terminated after said maximum shift time interval independent of said comparator output signal.

13. Apparatus as set forth in claim 6, further comprising diferentiating circuit means connected to said transmission output speed sensor means for furnishing a transmission acceleration signal having an amplitude corresponding to the fidrst derivative with respect to time of said transmission speed signal; wherein said shift terminate signal constitutes a first shift terminate signal;
   further comprising forced synchronization means (22) connected to said differentiating circuit means, said gear control means and said bistable circuit means for furnishing an additional shift terminate signal if said acceleration signal is less than a predetermined acceleration threshold value during upshift operations and is greater than a predetermined acceleration threshold value during downshift.

14. Apparatus as set forth in claim 13, wherein said gear control means furnishes an upshift signal indicative of a desired upshift operation;
   and wherein said forced synchronization means comprises first and second acceleration comparator means (90, 91) each having a direct and an inverting input and a comparator output for, respectively, furnishing a first and second comparator output signal when the signal at said direct input exceeds the signal at said inverting input, input connecting means (95, 98) for connecting said differentiating circuit means to said direct input of said first acceleration comparator means and said inverting input of said second acceleration comparator means, means (96, 99) for applying a first and second acceleration threshold value signal respectively to said inverting input of said first acceleration comparator means and said direct input of said second acceleration comparator means, and first and second acceleration logic circuit means (87, 88) each having a first input connected to the corresponding one of said acceleration comparator means and a second input connected to said gear control means for furnishing said additional shift terminate signal.

15. Apparatus as set forth in claim 14, wherein said first and second acceleration logic means each comprises a NOR gate.

16. Apparatus as set forth in claim 6, further comprising sample-and-hold circuit means (32) connected to said means for furnishing a load signal and said load/shift direction sensor means for transmitting said load signal directly to said load/shift direction sensor means in the absence of said modified shift signal and for furnishing a stored load signal corresponding to the amplitude of said load signal at the start of gear shift to said load/shift direction sensor means in the presence of said modified shift initiate signal.

17. Apparatus as set forth in claim 16, wherein said sample-and-hold circuit means comprises a sample-and-hold comparator means (153), having an output, an inverting input and a direct input first and second sample-and-hold switch means (152, 156) respectively operative in the presence and absence of said modified shift initiate signal for, respectively, connecting said sample-and-hold comparator means to said means for furnishing a load signal and to a reference potential, capacitor means connected from said output to said inverting input of said sample-and-hold comparator means, and a resistor (155) connected from said output of said sample-and-hold comparator means to said means for furnishing a load signal.

18. Apparatus as set forth in claim 16, wherein said pressure factor selector means has a signal input connected to said output of said sample-and-hold circuit means, a first, second and third pressure factor control input energized, respectively, in response to said selector signal, the absence of said modified shift initiate signal and the presence of said modified shift initiate signal, and an output for furnishing said pressure factor control signal, said pressure factor selector means comprising means for selecting one of a plurality of predetermined pressure factors under control of signals at said pressure factor control inputs and for multiplying the signal at said signal input by the so-selected one of said pressure factors, thereby creating said pressure factor control signal.

19. Apparatus as set forth in claim 18, wherein said plurality of pressure factors comprises a factor of 1.5, 1.0 and 0.3;
   and wherein said selected one of said plurality of factors is said factor of 1.5 in the absence of said modified shift initiate signal, a factor of 1.0 in the presence of said selector signal and said modified shift initiate signal, and a factor of 0.3 in the absence of said selector signal and the presence of said modified shift initiate signal.

20. Apparatus as set forth in claim 19, wherein said pressure factor selector means comprises operational amplifier means having an inverting input, a direct input and an output, first feedback resistor means (163) connected from said operational amplifier output to said inverting input, means for connecting said sample-and-hold circuit means to said inverting input, first and second additional feedback means (164, 165), and switch means (166, 167) for selectively connecting said first and second additional feedback means in parallel with said first feedback resistor means under control of said selector signal and said modified shift initiation signal.

21. Apparatus as set forth in claim 6, wherein said bistable circuit means comprises a flip-flop having a set input connected to receive said shift initiate signal, a plurality of reset inputs, a set output for furnishing said modified shift initiate signal and a reset output for furnishing a reset signal signifying the absence of said modified shift initiate signal.

22. Apparatus as set forth in claim 21, wherein said flip-flop comprises a first NOR gate (83) having a first input connected to receive said shift initiate signal, a second input, and an output constituting said set output, and a second NOR gate (84) having an output connected to said second input of said first NOR gate, a first input connected to said output of said first NOR gate, and a plurality of additional inputs for receiving said shift terminate signals.

23. Apparatus as set forth in claim 1, wherein said valve activator means comprises means for timing the start of activation of said first valve during activation of said second valve but a predetermined minimum time delay following said start of activation of said second valve, whereby said first and second valve are operated with positive overlap.

* * * * *